United States Patent [19]

Castle et al.

[11] 4,446,169

[45] May 1, 1984

[54] METHOD FOR MAKING SILICON CARBIDE COATINGS

[75] Inventors: Peter M. Castle; George G. Sweeney, both of Penn Hills; Lymperios N. Yannopoulos, Churchill Borough, all of Pa.

[73] Assignee: Westinghouse Electric Corp., Pittsburgh, Pa.

[21] Appl. No.: 418,941

[22] Filed: Sep. 16, 1982

[51] Int. Cl.³ .............................................. B05D 3/06
[52] U.S. Cl. .................................. 427/53.1; 423/345; 427/350; 427/387; 501/88; 528/12; 528/13; 528/18; 528/29
[58] Field of Search ....................... 427/53.1, 350, 387; 528/12, 13, 18, 29; 423/345; 501/88

[56] References Cited

U.S. PATENT DOCUMENTS

| | | | |
|---|---|---|---|
| 4,298,558 | 11/1981 | Baney et al. | 264/65 |
| 4,298,559 | 11/1981 | Baney et al. | 264/65 |
| 4,302,508 | 11/1981 | Hierholzer et al. | 428/367 |
| 4,310,481 | 1/1982 | Baney | 264/65 |
| 4,310,482 | 1/1982 | Baney | 264/65 |
| 4,310,651 | 1/1982 | Baney et al. | 528/21 |

FOREIGN PATENT DOCUMENTS 121137  7/1976  Fed. Rep. of Germany .

Primary Examiner—Michael R. Lusignan
Attorney, Agent, or Firm—R. P. Lenart

[57] ABSTRACT

A method is disclosed for preparing a silicon carbide-coated substrate without subjecting the substrate to unnecessary thermal stress. A coating of a silicon carbide precursor polymer is placed on a substrate and the coating is subjected to a laser beam of sufficient energy to raise the temperature of the coating in the area of impingement of the laser beam to approximately 1200° C. to 1600° C. until the coating is converted into a silicon carbide ceramic material. The area of laser beam impingement is located in an inert atmosphere or vacuum while the reaction is taking place.

18 Claims, 1 Drawing Figure

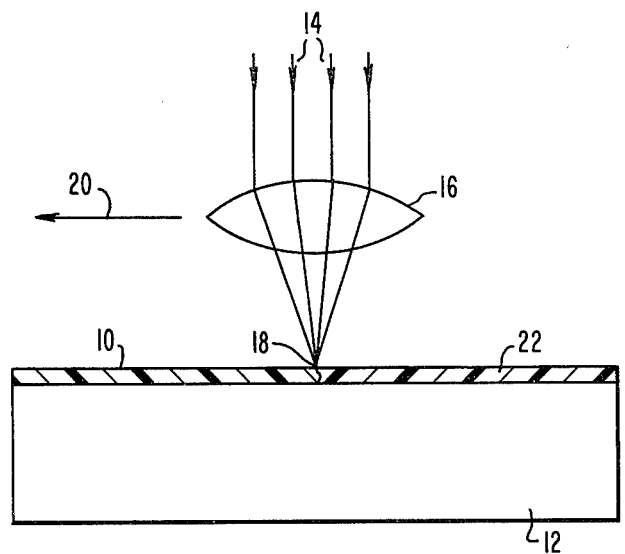

METHOD FOR MAKING SILICON CARBIDE COATINGS

BACKGROUND OF THE INVENTION

This invention relates to silicon carbide coatings on substrates and more particularly to a method for making such coatings by converting silicon carbide precursor polymers into silicon carbide while minimizing thermal stress on the substrate.

Various types of processes and equipment require materials which have hardened surfaces, resistance to corrosion and the capability to operate under high temperatures. Such material requirements can be fulfilled by refractory materials such as silicon carbide in applications such as claddings for high temperature service, hard facings, and bulk structural material. It is not, however, possible to place thin layers of silicon carbide on many kinds of substrates owing to the processing temperatures involved and the low melting degradation temperatures of the substrates to which one might wish to apply the silicon carbide coating. For example, U.S. Pat. No. 4,298,558, issued Nov. 3, 1981 to Baney et al. discloses a method of preparing an article coated with ceramic material in which a substrate is coated with a mixture of polysilane and fillers and the substrate is subsequently heated in an inert atmosphere or vacuum to a temperature in the range of 1200° C. to 1600° C. until the coating is converted to a silicon carbide ceramic. This process precludes the use of many substrates which would be adversely affected by the temperature involved.

Certain silicon carbide pre-ceramic polymers are known to decompose into silicon carbide when heated to a temperature in the range of 1200° C. to 1600° C. Various types of substrates can be coated with these polymers and subsequently heated to form silicon carbide-coated articles. A process which would provide for the necessary heating of the polymer coating without producing undue thermal stress on the substrate would greatly expand the number of suitable substrates. If the heating is sufficiently localized and controllable, a variety of sizes and shapes of substrates can be used and intricate patterns of silicon carbide can be created on the substrate.

SUMMARY OF THE INVENTION

In accordance with the present invention, silicon carbide-coated articles can be prepared by performing the steps of: placing a coating of a silicon carbide precursor polymer on a substrate; and directing onto the coating a laser beam with sufficient energy to raise the temperature of the coating in the area of impingement of the laser beam to approximately 1200° C. to 1600° C., until said coating is converted into a silicon carbide ceramic material, while the coating in the area of impingement is located in an inert atmosphere or vacuum. The laser beam can be moved relative to the coating to coat an entire substrate or to form an intricate pattern of silicon carbide on the substrate. In order to limit flaking and spalling, the process can be carried out in a series of operations wherein a portion of the polymer coating is converted to silicon carbide during each period of laser radiation.

A laser beam having a power density of approximately 10±5 watts/mm² can be used in accordance with this invention to heat a coating of polysilastyrene in an inert atmosphere for approximately two seconds to a temperature of about 1200° C. to 1600° C., thereby forming a silicon carbide layer having a thickness of about 1000 Angstroms to 1 micron.

BRIEF DESCRIPTION OF THE DRAWING

The single FIGURE is a schematic representation of a silicon carbide layer being formed on a substrate.

DESCRIPTION OF THE PREFERRED EMBODIMENT

Polysilastyrene is an organo-polysilane compound having the following structure:

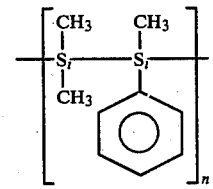

It has a polymeric silicon backbone and is soluble in toluene and similar solvents. This solubility is in contrast with the insolubility of previously discovered organo-polysilanes. A heat treatment of polysilastyrene at about 1400° C. produce silicon carbide.

The preferred embodiment of the present invention utilizes the good solubility of polysilastyrene, having an average formula $(CH_3)_3Si_2(C_6H_5)$ to produce mixtures which are suitable for application as reproducible coatings where a variety of methods might be employed such as painting, spraying, dipping, etc. Once the substrate has been properly coated, a carbon dioxide or other type of laser of appropriate power rating is used to decompose the polysilastyrene to silicon carbide in the presence of an inert atmosphere or vacuum. The use of a laser allows the time and temperature control necessary to cause the conversion to occur without undue thermal stress on the substrate. In this manner it is possible to coat many types of substrates with silicon carbide. A list of possible substrates includes: glasses, ceramics, metals and polymeric substrates. This process is particularly advantageous for low-melting point metals.

Referring to the drawing, a coating of a silicon carbide precursor polymer 10, such as polystyrene, has been placed on substrate 12. Laser beam 14, which may be produced by various types of lasers such as carbon dioxide or argon ion having a power density of approximately 10±5 watts/mm², is focused by focusing means 16 to provide for an area of impingement 18 of controlled size. The coating must be exposed to the laser beam for a length of time sufficient for the coating to be heated to approximately 1200° C. to 1600° C. This length of exposure varies from one to three seconds in the preferred embodiment. As shown in this embodiment, laser beam 14 is moved in the direction indicated by arrow 20 such that the area of impingement 18 moves across the polymer coating leaving behind a silicon carbide layer 22.

The process illustrated in the drawing has been demonstrated utilizing a quartz substrate having been coated by a layer of polysilastyrene. A carbon dioxide laser was used to produce a laser beam having an energy density of approximately 10 watts per square millimeter in the area of impingement. The laser beam was directed onto the coating to heat the coating to approximately 1400° C., which is sufficient to decompose the polysilastyrene into silicon carbide. After exposing the coating to the laser beam for about two seconds, the resulting silicon carbide layer ranged in thickness from approximately 1000 Angstroms to 1 micron.

The polysilastyrene used in the preferred embodiment was synthesized by combining chlorosilanes $(CH_3)_2SiCl_2$ and $(C_6H_5)(CH_3)SiCl_2$ in a 3.9 to 1 mole ratio, respectively. The solvent, xylene, was dried by refluxing over Na for 24 hours. In an argon atmosphere glove box, 26.9 grams of Na were loaded into the reaction flask and sealed. A nitrogen purge and condenser were attached to the flask. The xylene was added to the reaction flask and heat was applied to melt the Na. With the heat off, the chlorosilanes were mixed and slowly added to the flask, with vigorous stirring over a twenty minute period. This produced a purple-black solution, and refluxing occurred. When addition of the chlorosilanes was complete, heat was again applied to the reaction flask to continue the refluxing. After about 6.5 hours of stirring and heating, the reaction mixture was allowed to reflux for about 16 hours without stirring. The next day the color remained unchanged and the reaction mixture was stirred and refluxed for 8 hours. The stirrer, heat, and nitrogen purge were turned off and the reaction flask sealed to the atmosphere. The reaction mixture was quenched with 150 ml of methanol ($CH_3OH$), followed by 250 ml of an equal volume mixture of 1 M HCl and ethanol added dropwise while stirring under flowing nitrogen. The addition of the $CH_3OH$ resulted in an exothermic reaction and the color changed from purple-black to a light purple. Stirring was continued for 8 hours then an additional 50 ml of the 1 M HCl/EtOH mixture were added. Stirring continued for one hour after which the color was lavender. The reaction system was sealed off, and, after remaining stagnant overnight, another 65 ml of the 1 M HCl/EtOH did not eliminate the lavender color.

In a separatory funnel the reaction mixture formed three layers, a white salt layer soluble in water, a clear liquid layer, and a thick lavender liquid layer. Boiling the clear liquid layer to evaporate any solvent left a light blue salt. The salt layer was interspersed with purple specks. The thick lavender layer was mixed with xylene in an effort to extract the polymer. The soluble portion turned the xylene into a cloudy white solution and insoluble, grainy salt-like particles settled out of solution. The grainy particles were not soluble in water. The white xylene solution was slowly added to methanol and a precipitate formed. The xylene-methanol solution was filtered leaving a very white, gummy, wax-like solid. A sample of the clear liquid layer was also added to methanol but no precipitate formed. The clear liquid, when boiled down to a concentrate and cooled, formed square yellow, salt-like crystals soluble in water. The wax-like polymer was analyzed and applied to a substrate. Although this polymer is used in the preferred embodiment of this invention, it must be understood that various other silicon carbide precursor polymers, such as those described in U.S. Pat. No. 4,298,558 can also be used in accordance with this invention.

While a preferred embodiment of the present invention has been described, it must be understood that various changes in the process parameters may be made without departing from the scope of the invention. For example, the required laser beam energy density will increase with increasing thermal conductivity of the substrate material. A metal substrate may require a laser beam power density which is greater than required for a quartz substrate by a factor of 2 or 3. In addition, the process may be carried out in a series of operations wherein only a portion of the coating is converted to silicon carbide during each period of laser irradiation. Such a sequential exposure process can be controlled more closely than a single exposure process. It is therefore intended that the appended claims include all modifications of the process which are included in the scope of the invention.

We claim:

1. A method of preparing a silicon carbide-coated article comprising the steps of:
   placing a coating of a silicon carbide precursor polymer on a substrate; and
   directing onto said coating a laser beam with energy sufficient to raise the temperature of said coating in the area of impingement of the laser beam to approximately 1200° C., to 1600° C., until said coating is converted into a silicon carbide ceramic material, wherein said coating in the area of impingement is located in an inert atmosphere or vacuum.

2. A method of preparing a silicon carbide-coated article as recited in claim 1, further comprising the step of:
   moving said coating and said laser beam relative to one another at a rate sufficient to cause each increment of said coating exposed within the area of impingement to be heated to a temperature of approximately 1200° C. to 1600° C.

3. A method of preparing a silicon carbide-coated article as recited in claim 1, wherein said silicon carbide is in the form of a layer which ranges in thickness from about 1000 Angstroms to 1.0 micron.

4. A method of preparing a silicon carbide-coated article as recited in claim 1, wherein said laser beam has an energy density of about $10 \pm 5$ watts per square millimeter.

5. A method of preparing a silicon carbide-coated article as recited in claim 1, wherein said silicon carbide precursor polymer is an organopolysilane.

6. A method of preparing a silicon carbide-coated article as recited in claim 5, wherein said organopolysilane is polysilastyrene.

7. A method of preparing a silicon carbide-coated article as recited in claim 1, wherein said laser beam is generated by a carbon dioxide laser.

8. A method of preparing a silicon carbide-coated article as recited in claim 1, wherein said coating is irradiated by said laser beam for about one to three seconds.

9. A method of preparing a silicon carbide-coated article as recited in claim 1, wherein said substrate is quartz.

10. A method of preparing a silicon carbide-coated article comprising the steps of:
    (a) placing a coating of a silicon carbide precursor polymer on a substrate;
    (b) directing onto said coating a laser beam with energy sufficient to raise the temperature of a portion of said coating in the area of impingement of the laser beam to approximately 1200° C. to 1600° C., until said portion of said coating is converted into a silicon carbide ceramic material, wherein said coating in the area of impingement is located in an inert atmosphere or vacuum; and (c) repeating step (b) to convert an additional portion of said coating into a silicon carbide ceramic material.

11. A method of preparing a silicon carbide-coated article as recited in claim 10, further comprising the steps of:

moving said coating and said laser beam relative to one another at a rate sufficient to cause a portion of each increment of said coating exposed within the area of impingement to be heated to a temperature of approximately 1200° C. to 1600° C.

12. A method of preparing a silicon carbide-coated article as recited in claim 10, wherein said silicon carbide is in the form of a layer which ranges in thickness from about 1000 Angstroms to 1.0 micron.

13. A method of preparing a silicon carbide-coated article as recited in claim 10, wherein said laser beam has an energy density of about 10±5 watts per square millimeter.

14. A method of preparing a silicon carbide-coated article as recited in claim 10, wherein said silicon carbide precurser polymer is an organopolysilane.

15. A method of preparing a silicon carbide-coated article as recited in claim 14, wherein said organopolysilane is polysilastyrene.

16. A method of preparing a silicon carbide-coated article as recited in claim 10, wherein said laser beam is generated by a carbon dioxide laser.

17. A method of preparing a silicon carbide-coated article as recited in claim 10, wherein said laser beam is generated by an argon ion laser.

18. A method of preparing a silicon carbide-coated article as recited in claim 10, wherein said substrate is quartz.

* * * * *